(12) United States Patent
Schindler et al.

(10) Patent No.: US 7,583,333 B2
(45) Date of Patent: Sep. 1, 2009

(54) PROCESS FOR THE PRODUCTION OF LCDS

(75) Inventors: Ulrich Schindler, Furth/Bayern (DE); Steffen Weiss, Nuremberg (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 175 days.

(21) Appl. No.: 11/981,904

(22) Filed: Nov. 1, 2007

(65) Prior Publication Data
US 2008/0170182 A1    Jul. 17, 2008

(30) Foreign Application Priority Data
Nov. 8, 2006    (DE)    ............ 10 2006 052 606

(51) Int. Cl.
*G02F 1/1333*    (2006.01)
(52) U.S. Cl. ............... 349/92; 349/56; 349/84; 349/86
(58) Field of Classification Search .......... 349/56, 349/84, 86, 92
See application file for complete search history.

(56) References Cited

U.S. PATENT DOCUMENTS

| 5,354,498 A | 10/1994 | Akashi et al. | |
| 5,673,127 A * | 9/1997 | Takahara et al. | 349/140 |
| 7,259,106 B2 * | 8/2007 | Jain | 438/737 |
| 2004/0189893 A1 | 9/2004 | Choi et al. | |

FOREIGN PATENT DOCUMENTS

| EP | 1 447 706 A2 | 8/2004 |
| EP | 1 712 949 | 10/2006 |
| JP | 4-37820 | 2/1992 |
| JP | 2001-125086 | 5/2001 |
| JP | 2006-133645 | 5/2006 |
| WO | WO 01/67170 | 9/2001 |
| WO | WO03/104884 | 12/2003 |

* cited by examiner

*Primary Examiner*—Jennifer Doan
(74) *Attorney, Agent, or Firm*—Hoffmann & Baron, LLP

(57) ABSTRACT

There is described a process for the production of LCDs, in particular PDLCDs, preferably in a roll-to-roll process, wherein in a first process step a first contact layer (12) and a first electrode layer (14) spaced therefrom is applied to a base carrier (10). A first and a second delimitation layer (18, 20) is then applied to the base carrier (10). Thereafter a functional layer (26) comprising a PDLCD mixture provided in a porous support matrix is applied between the first and second delimitation layers (18 and 20). A protective layer (28) is then applied to the functional layer (26) between the first and second delimitation layers (18 and 20) and finally there is applied to the protective layer (28) a second electrode layer (30) which is contacted with the first contact layer (12).

10 Claims, 1 Drawing Sheet

PROCESS FOR THE PRODUCTION OF LCDS

This application claims priority based on German Application No.102006052606.6, filed on Nov. 8, 2006.

BACKGROUND OF THE INVENTION

The invention concerns a process for the production of LCDs (liquid crystal display). Those LCDs can be in particular PDLCDs (polymer dispersed LCDs) which are to be produced for example in a roll-to-roll process.

The production of PDLCDs in a roll-to-roll process has hitherto been obstructed by virtue of the fact that the functional layer of the respective PDLCD which comprises a porous polymer, that is to say support, matrix filled with LC material, is not closed at the surface. After hardening of the matrix the LCs are present in a non-crosslinked, fluid state. By virtue of the fluid LCs at the surface of the matrix, it has hitherto not been possible to carry out a usually multi-stage roll-to-roll process because the functional layer would stick to other surfaces which are brought into contact therewith. That would result in damage to the functional layer.

SUMMARY OF THE INVENTION

Therefore the object of the invention is to provide a process of the kind set forth in the opening part of this specification, wherein such sticking of the functional layer to other surfaces which are brought into contact therewith is prevented and consequently damage to the functional layer is avoided.

In accordance with the invention that object is attained by the features of claim 1, that is to say by the following process steps:
- applying a first contact layer and a first electrode layer spaced therefrom by a separation surface to a base carrier,
- applying an electrically insulating first delimitation layer to the base carrier at the separation surface and an electrically insulating second delimitation layer to the first electrode layer, wherein a functional region and a second contact surface remote from the first contact layer remains free at the first electrode layer,
- applying a functional layer comprising a PDLCD mixture provided in a porous support matrix in the functional region between the first and second delimitation layers and hardening of the functional layer,
- applying a protective layer to the hardened PDLCD mixture between the first and second delimitation layers, and
- applying a second electrode layer to the protective layer, wherein the second electrode layer projects at the first contact layer beyond the protective layer with a projection portion and the projection portion is contacted by way of a conductive connecting layer portion to the first contact layer.

The first and the second electrode layers can be applied by printing, vapor deposition, sputtering, embossing or lamination. Likewise it is possible for the two electrodes to be formed from an electrically conductive cloth such as for example a metal mesh. The two electrodes can be transparent, non-transparent or semi-transparent. It is also possible for one electrode to be transparent and the other electrode to be non-transparent or semi-transparent. At least one of the two electrodes can also be structured, that is to say provided for example with a pattern, a hologram or the like. If both electrodes are transparent a hologram or the like can also be provided in another layer of the LCD according to the invention.

The functional layer is sealed off outwardly by means of the protective layer so that the application of the second electrode layer to the protective layer is possible without any problem.

With the process according to the invention, a PEDOT/PSS layer or a non-conductive, thin, film-forming layer can be used as the protective layer. Irrespective of whether a conductive or a non-conductive protective layer is used, the situation involves closure of the pores, filled with LC, of the functional layer comprising a PDLCD mixture provided in a porous support matrix. The functional layer which is dry at its surface to such an extent permits further processing with conventional processes such as printing processes, laminating processes or the like.

With the process according to the invention a flexible carrier can be used as the base carrier. Likewise it is possible that the carrier is not flexible, that is to say it is stable in respect of shape. The carrier can be transparent, semi-transparent or non-transparent over its full area or part of its area. The carrier can itself form one of the electrodes. In such a configuration of the last-mentioned kind, it is necessary to provide an electrical insulating layer prior to the application of the second electrode.

The carrier can be in the form of a shrink film, it can be printed upon or not printed upon, it can—in the case of an embossing film—only form an intermediate carrier, it can be replicated or non-replicated, it can be selectively light absorbing, and so forth.

The LCD according to the invention can have a rectangular or quadrangular base surface or can involve any other base surface configuration.

The second electrode layer can be provided on a cover carrier and laminated onto the protective layer. The cover carrier—as in the case of the base carrier—can involve a flexible cover carrier so that it is easily possible, in a highly productive manner, for the process according to the invention to be carried out in a roll-to-roll process. It is possible in that way for PDLCDs to be continuously produced.

Further details, features and advantages will be apparent from the description hereinafter of successive process steps, illustrated in the drawings, of an embodiment by way of example of the process according to the invention for the production of PDLCDs.

DETAILED DESCRIPTION OF THE INVENTION

Figure 1:
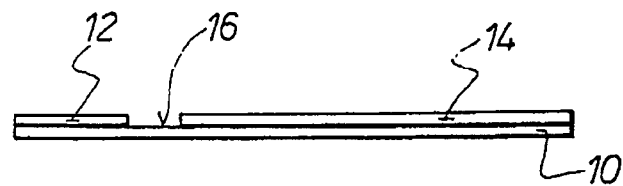
FIGS. 1-5 show successive process steps according to the present invention.

FIG. 1 shows a first process step, wherein a first contact layer 12 and a first electrode layer 14 are applied to a base carrier 10, the first contact layer 12 and the first electrode layer 14 being separated, that is to say spaced, from each other by a separation surface 16.

The base carrier 10 can be a flexible carrier, for example a film of a plastic material. As already mentioned hereinbefore, the carrier can also have other mechanical and optical properties.

Figure 2:
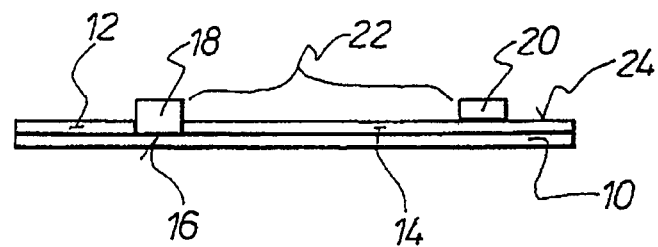

After the first process step, in a subsequent process step as shown in FIG. 2 an electrically insulating first delimitation layer 18 is applied to the base carrier 10 at the separation surface 16 and an electrically insulating second delimitation layer 20 is applied to the first electrode layer 14, wherein a functional region 22 and a second contact surface 24 which is remote from the first contact layer 12 remain free at the first electrode layer 14 between the first and second delimitation layers 18 and 20.

Figure 3:
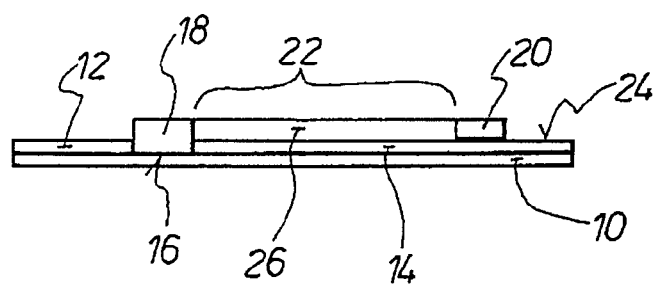

FIG. 3 clearly shows the process step which follows the process step of FIG. 2 and in which a functional layer 26 comprising a PDLCD mixture provided in a porous support matrix is applied to the functional region 22 and dried.

Figure 4:
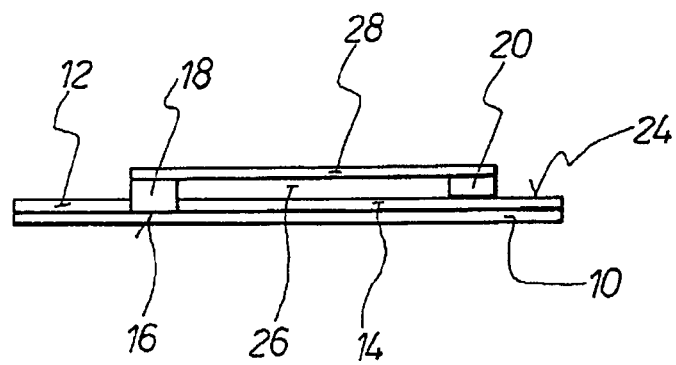

In a process step following the process step of FIG. 3 a protective layer 28 is applied to the functional layer 26 comprising the hardened PDLCD mixture provided in the porous support matrix, between the first delimitation layer 18 and the second delimitation layer 20. That protective layer 28 can be for example a conductive PEDOT/PSS layer or a non-conductive, thin, film-forming layer. That fourth process step is shown in FIG. 4.

Figure 5:
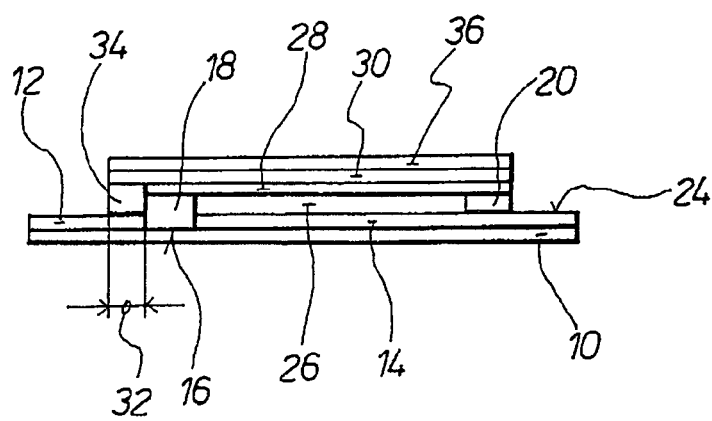

In a subsequent process step as illustrated in FIG. 5 a second electrode layer 30 is applied to the protective layer 28. The second electrode layer 30 projects at the first contact layer 12 beyond the protective layer 28 with a projection portion 32. The projection portion 32 is contacted with the first contact layer 12 by means of a conductive connecting layer portion 34.

The second electrode layer 30 can be provided on a cover carrier 36 and laminated onto the protective layer 28. The cover carrier 36, like the base carrier 10, can preferably be a flexible cover carrier so that it is possible for the process as shown in FIGS. 1 through 5 to be carried out in a roll-to-roll process. After that process has been carried out the base carrier 10 and/or the cover carrier 36 can be detached. If the first electrode layer 14 is opaque the second electrode layer 30 must be light-transmitting—and vice-versa. Likewise it is for example possible for both electrode layers 14 and 30 to be light-transmitting.

Identical details are identified in FIGS. 1 through 5 by the same respective references so that there is no need for all details to be fully described in connection with all Figures.

LIST OF REFERENCES 10 base carrier
12 first contact layer (at 10)
14 first electrode layer (at 10)
16 separation surface (between 12 and 14 at 10)
18 first delimitation layer (at 16)
20 second delimitation layer (at 14)
22 functional region (between 18 and 20)
24 second contact surface (of 14)
26 functional layer (at 22)
28 protective layer (on 26 between 18 and 20)
30 second electrode layer (on 28)
32 projection portion (of 30 at 18)
34 connecting layer portion (between 32 and 12)
36 cover carrier (of 30)

The invention claimed is:

1. A process for the production of LCDs, in particular PDLCDs, comprising the steps of:
    applying a first contact layer and a first electrode layer spaced therefrom by a separation surface to a base carrier,
    applying an electrically insulating first delimitation layer to the base carrier at the separation surface and an electrically insulating second delimitation layer to the first electrode layer, wherein a functional region and a second contact surface remote from the first contact layer remains free at the first electrode layer,
    applying a functional layer comprising a PDLCD mixture provided in a porous support matrix in the functional region between the first and second delimitation layers and hardening of the functionally layer,
    applying a protective layer to the functional layer between the first and second delimitation layers, and
    applying a second electrode layer to the protective layer, wherein the second electrode layer projects at the first contact layer beyond the protective layer with a projection portion and the projection portion is contacted by way of a conductive connecting layer portion to the first contact layer.

2. A process as set forth in claim 1, wherein a flexible carrier is used as the base carrier.

3. A process as set forth in claim 1, wherein a PEDOT/PSS or an ITO electrode material is used for the first electrode layer.

4. A process as set forth in claim 1, wherein an adhesive PDLCD mixture in a crosslinked porous support matrix is used as the functional layer.

5. A process as set forth in claim 4 wherein the PDLCD mixture is provided in different concentration relationships.

6. A process as set forth in claim 1, wherein a PEDOT/PSS layer is used as the protective layer.

7. A process as set forth in claim 1, wherein a non-conductive, thin, film-forming layer is used as the protective layer.

8. A process as set forth in claim 1, wherein the second electrode layer is provided on a cover carrier and is laminated onto the protective layer.

9. A process as set forth in claim 8, wherein a flexible cover carrier is used as the cover carrier.

10. A process as set forth in claim 1, wherein a roll-to-roll process is carried out.

* * * * *